(No Model.)

W. F. BARNETT & F. LA F. ADAMS.
PLOW STOCK.

No. 346,978. Patented Aug. 10, 1886.

Witnesses
James M. Hilton
Wm. T. Gill

Inventors
Wm. F. Barnett
F. L. Adams
By his Attorneys
C. A. Snowden

UNITED STATES PATENT OFFICE.

WILLIAM FRANKLIN BARNETT AND FRANKLIN LA FAYETTE ADAMS, OF HAMPTON, GEORGIA.

PLOW-STOCK.

SPECIFICATION forming part of Letters Patent No. 346,978, dated August 10, 1886.

Application filed May 15, 1886. Serial No. 202,304. (No model.)

*To all whom it may concern:*

Be it known that we, WILLIAM FRANKLIN BARNETT and FRANKLIN LA FAYETTE ADAMS, citizens of the United States, residing at Hampton, in the county of Henry and State of Georgia, have invented a new and useful Improvement in Plow-Stocks, of which the following is a specification.

Our invention relates to an improvement in plows; and it consists in the peculiar construction and combination of devices that will be more fully set forth hereinafter, and particularly pointed out in the claim.

Figure 1:
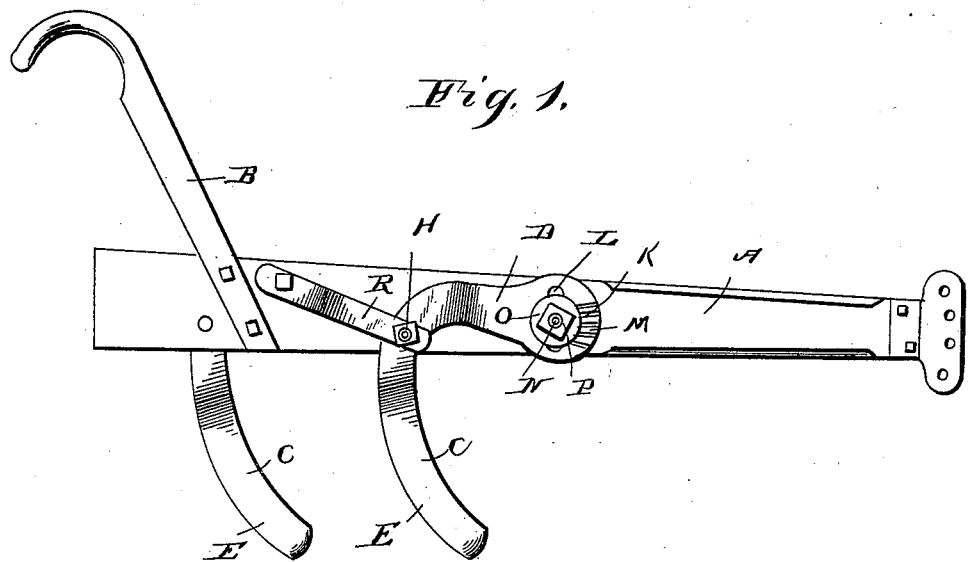
Figure 2:
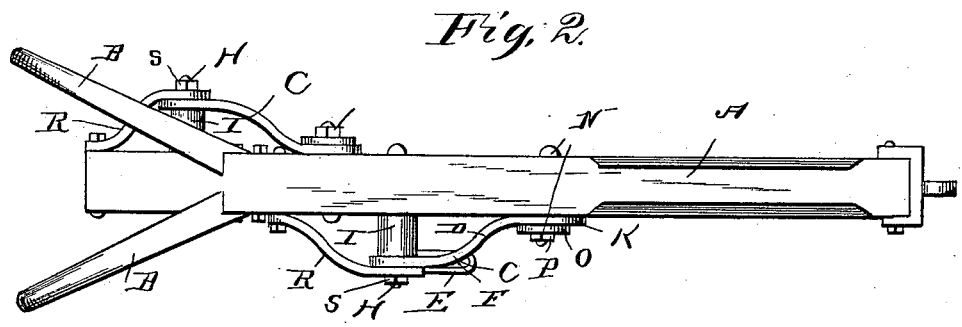
Figure 3:
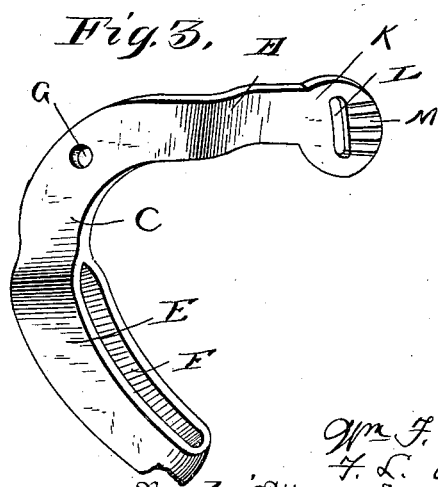

In the drawings, Figure 1 is a side elevation of our invention. Fig. 2 is a top plan view of the same. Fig. 3 is a detail perspective view of one of the plow-feet.

A represents the plow-beam, and B represents the usual plow-handles, which are attached to the rear end of the plow-beam.

C represents the plow-feet, which are each made of a single piece of metal, and are curved, as shown, and bent to form substantially a right angle, thereby forming the beams D and the standards E. The standards are provided with the usual slot, F, to admit the clamping-bolts that secure the shovels thereto. The plow-feet are provided each with a transverse opening, G, and transverse bolts H extend through openings, which are made in the plow-beam at a suitable distance apart, and project outwardly from the plow-beam in opposite directions. On the shanks of the bolts are secured blocks I, which are of suitable length and diameter, and the plow-feet are pivoted on the said bolts, as shown. The front arm or beam, D, of each plow-foot is provided with an enlarged head, K, having a segmental slot, L, drawn from the center of the pivotal bolt, and the outer sides of the enlarged head K are roughened or serrated, as at M.

N represents transverse bolts, which extend through openings made in the plow-beam and enter the slots L.

Washers O are placed on the bolts M and bear against the roughened outer sides of the head, and are clamped thereto by means of nuts P, which are screwed onto the bolts.

From this construction it will be readily understood that the plow-feet may be adjusted so as to cause the plows or shovels to enter the ground at any desired angle.

In order to securely brace the plow-feet to the beam, we provide clamp-arms R, the rear ends of which are pivoted or bolted to the beams at a suitable distance in rear of the blocks I, and the front ends of the said clamping-arms are secured on the outer ends of the bolts H by means of nuts S.

When the plow-feet are secured on opposite sides of the plow-beam, one in advance of the other, as shown and hereinbefore described, the plow is adapted for use as a double-shovel cultivator.

When it is desired to use the plow as a ridger, for covering seed or throwing up ridges, the front plow-foot is detached from the plow beam and secured to the rear end thereof, in a line with the rear plow-foot, by means of a long bolt which secures both of the said feet to the beam.

A plow thus constructed is extremely light, cheap, and simple, is very strong and durable, is not likely to get out of order, and may be adjusted to suit the varying requirements of different kinds of work.

Having thus described our invention, we claim—

The combination, with the plow-beam having the transverse bolts H and N, of the plow-feet having the standards C, and the arms or beams D, formed integrally and pivoted on the bolts H, the front ends of the arms D having segmental slots L, in which the bolts N extend, the clamping-nuts screwed onto the said bolts and bearing on the ends of the arms, and the brace-arms R, having their rear ends bolted to the plow-beam, and their front ends secured on the bolts H and bearing on the outer sides of the arms or beams D, substantially as described.

In testimony that we claim the foregoing as our own we have hereto affixed our signatures in presence of two witnesses.

WILLIAM FRANKLIN BARNETT.
FRANKLIN LA FAYETTE ADAMS.

Witnesses:
E. R. JAMES,
J. J. THACKSTON.